United States Patent

Gorby et al.

[11] 3,888,372
[45] June 10, 1975

[54] FRONT END LOADER DEVICE

[75] Inventors: Oliver L. Gorby, Fargo, N. Dak.; Dennis A. Rice, Cedar Falls, Iowa

[73] Assignee: Dynamic Industries, Inc., Barnesville, Minn.

[22] Filed: June 1, 1973

[21] Appl. No.: 366,104

[52] U.S. Cl.............. 214/776; 180/89 R; 280/492
[51] Int. Cl............................................. B66f 9/00
[58] Field of Search........... 180/51, 89 R; 280/492; 60/454; 214/140, 776

[56] References Cited
UNITED STATES PATENTS

| | | | |
|---|---|---|---|
| 2,242,807 | 5/1941 | Austin | 60/454 |
| 3,095,990 | 7/1963 | Granryd | 214/762 |
| 3,240,284 | 3/1966 | Finneman | 280/492 |
| 3,289,871 | 12/1966 | Tourneau et al. | 214/674 |
| 3,349,864 | 10/1967 | Wagner | 180/51 |
| 3,521,719 | 7/1970 | Forpahl | 180/51 |

Primary Examiner—Robert J. Spar
Assistant Examiner—Lawrence J. Oresky
Attorney, Agent, or Firm—Robert E. Kleve

[57] ABSTRACT

The invention comprises a front end loader having a front and rear frame, with an articulated pivotal connection therebetween. The engine is mounted in the rear frame and the operator's seat is mounted directly over the engine and is pivotally mounted to pivot upward to provide direct access to the top of the engine. The loader has a hydrostatic drive for the front and rear wheels mounted to the front and rear frames, respectively, which is powered by the engine, and a hydraulic system for hydraulically lifting and pivoting a bucket and the like on the front frame. The rear frame has filters for the hydrostatic and hydraulic system which project out the side of the rear frame for exchange and replacement. The device has a lever arm in its articulated pivotal connection, with the arm projecting a substantial distance into an operative compartment area on the rear frame between the operator's seat and control panel and along the floor of the compartment area and partially past the accelerator pedal so as to be of sufficient length for effective oscillation.

2 Claims, 10 Drawing Figures

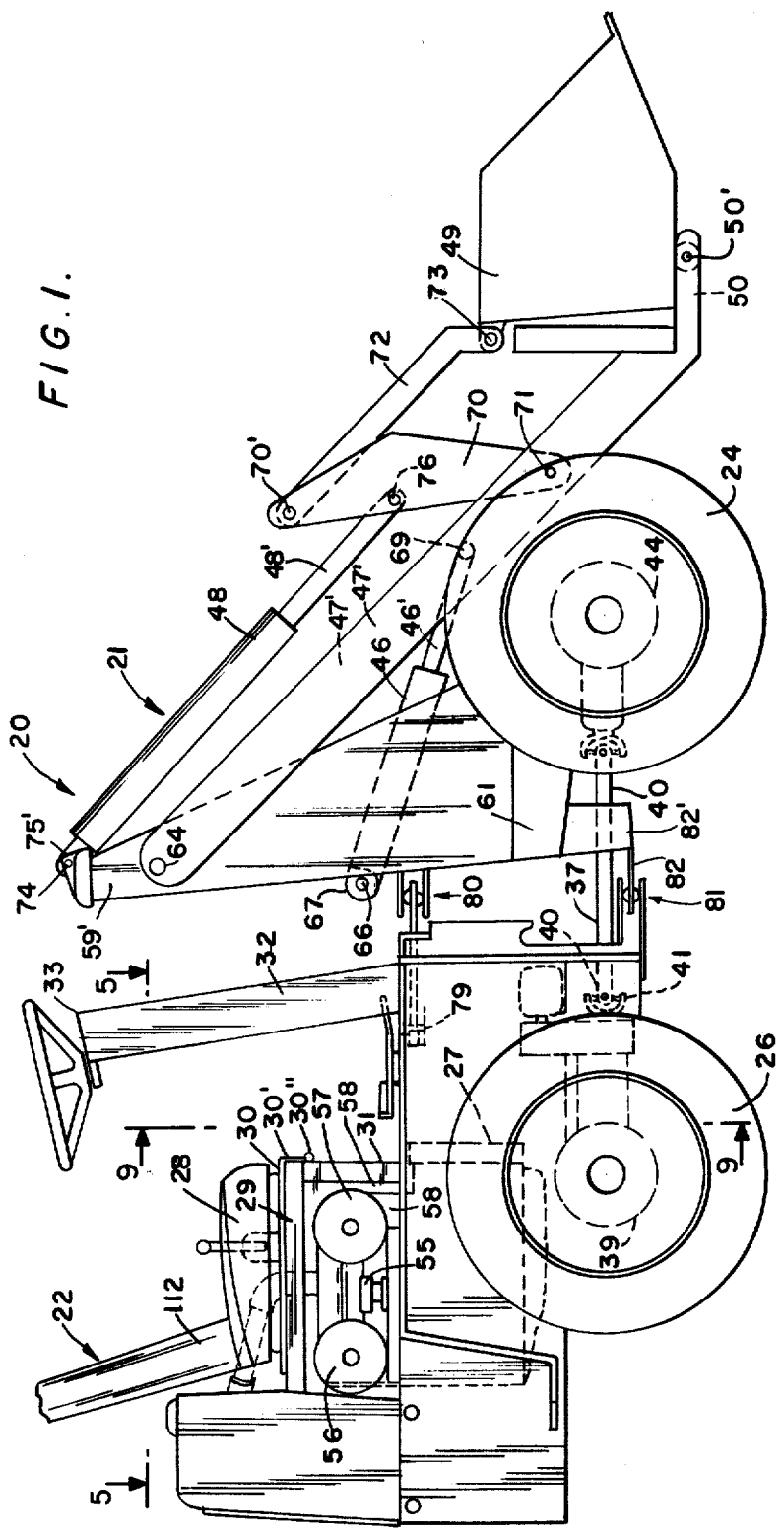

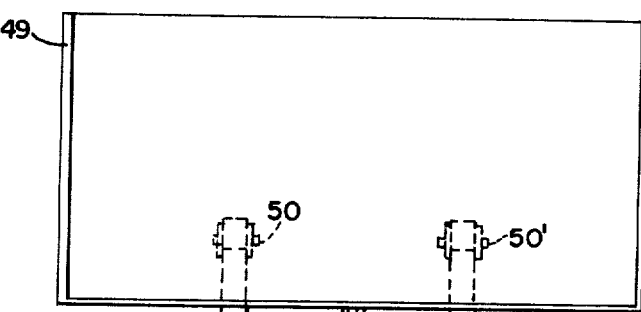
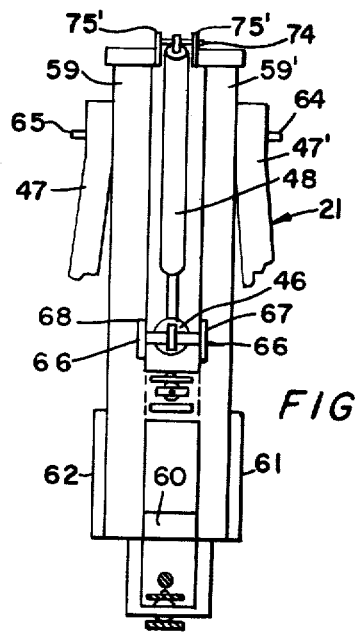
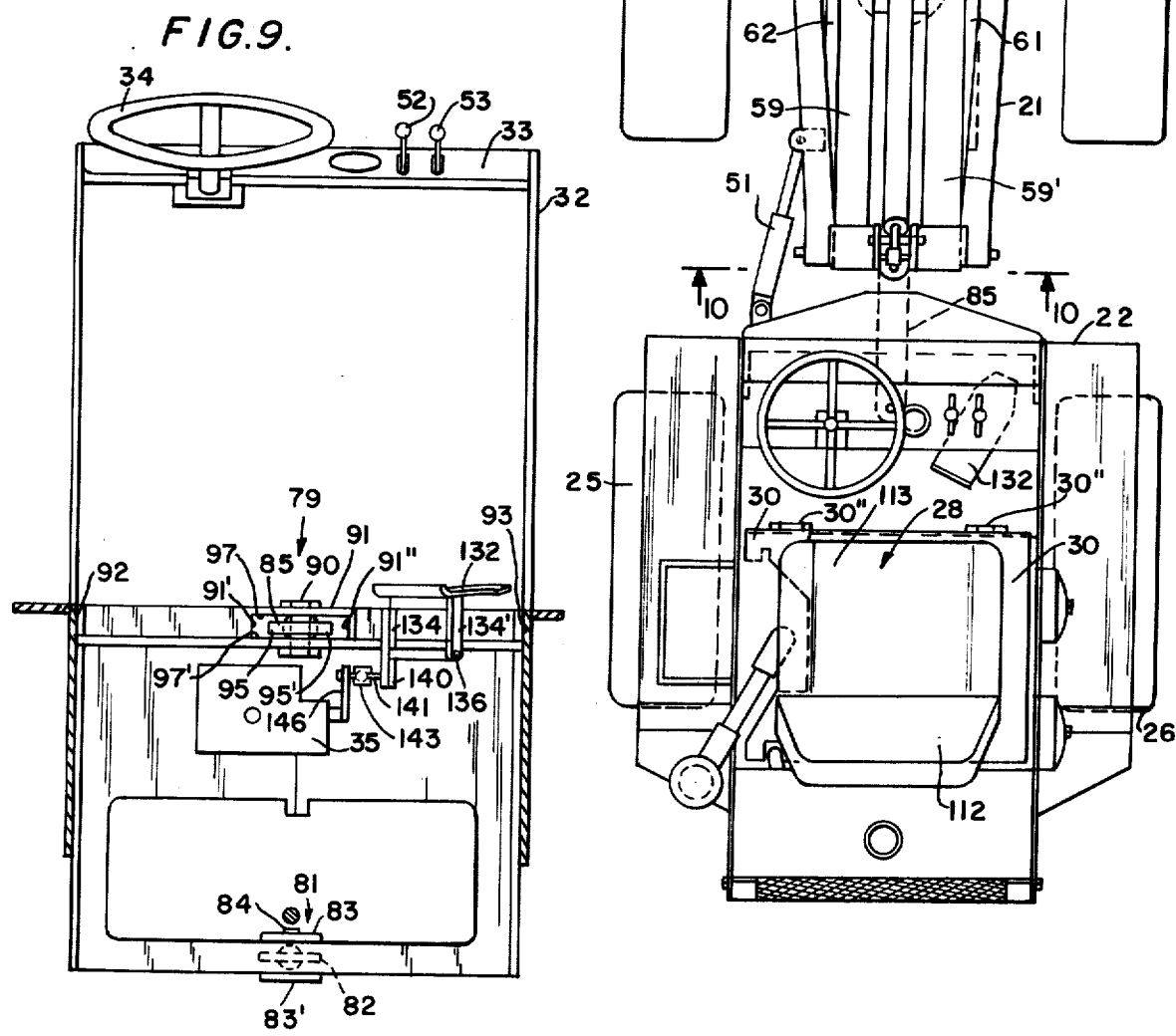

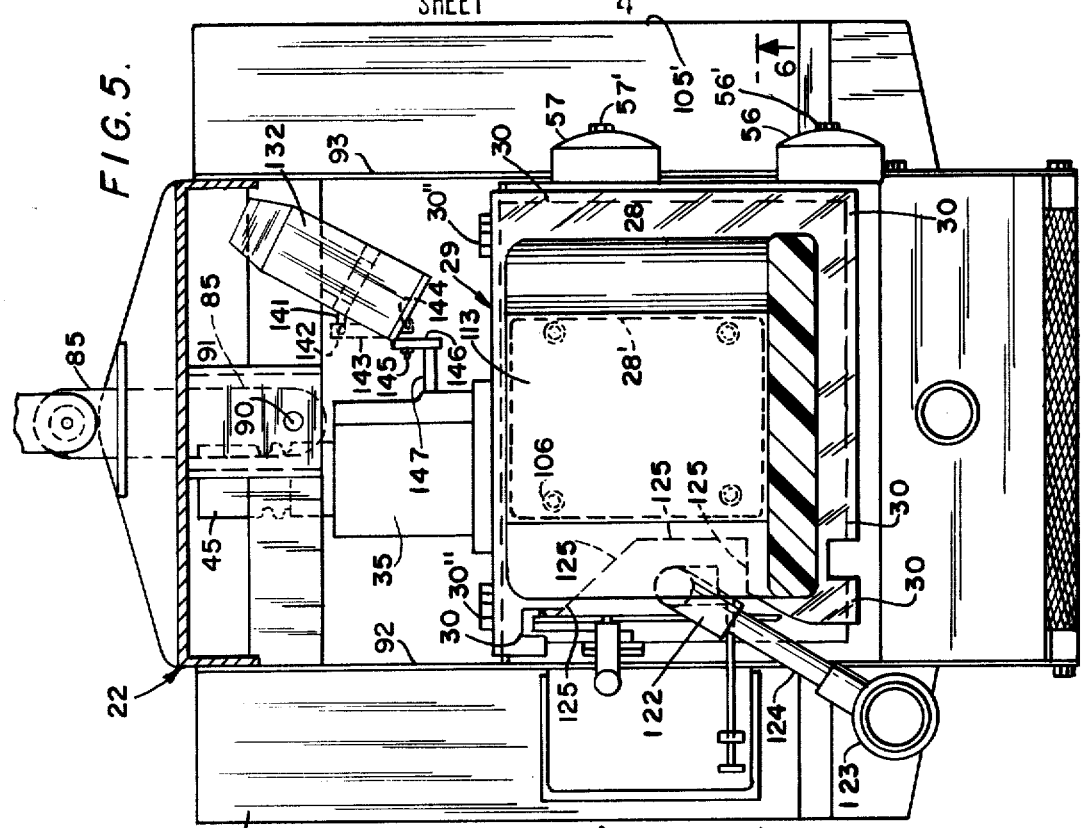
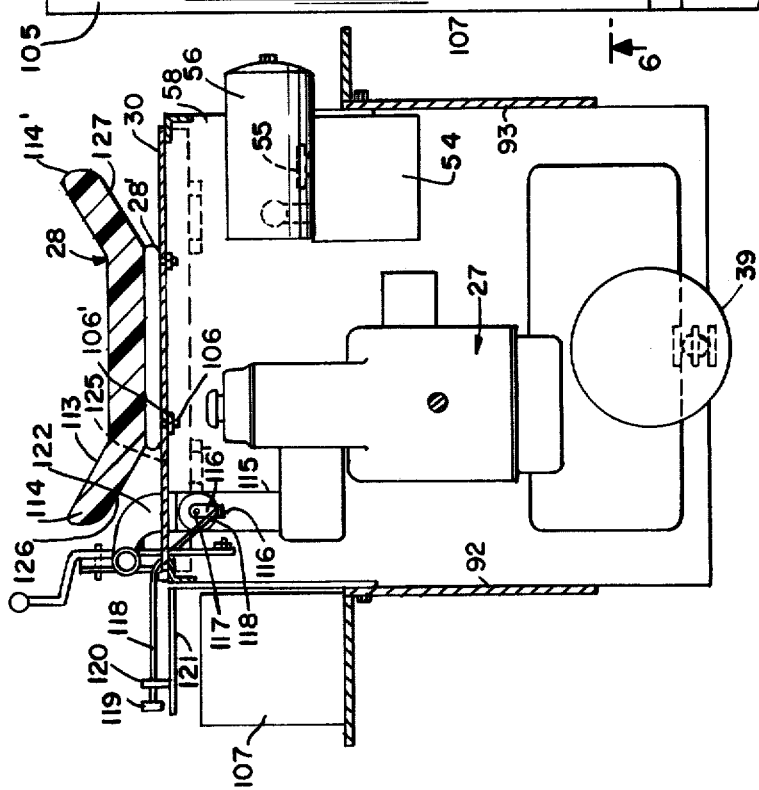

FRONT END LOADER DEVICE

This invention relates to front end loaders.

It is an object of the invention to provide a novel compact front end loader with a novel compact rear framework construction for the engine and hydraulic drive and power components so as to take a minimum amount of space in the rear frame and to provide access to the components for servicing and repair.

It is another object of the invention to provide a novel compact front end loader with the engine mounted in the rear frame and directly beneath the operator's seat, and with the operator's seat being pivotally mounted to pivot upwart to provide access to the engine, and with the engine offset slightly to enable the seat to clear portions of the engine, so that the seat may be located at a lower position in relation to the engine for a more compact construction.

Further objects and advantages of the invention will become apparent as the description proceeds and when taken in conjunction with the accompanying drawing wherein:

FIG. 1 is a rignt side elevational view of the front end loader invention.

FIG. 4 is a top plan view of the front end loader.

FIG. 5 is an enlarged top view of the rear frame of the front end loader taken along line 5—5 of FIG. 1.

FIG. 6 is a cross-sectional view taken along line 6—6 of FIG. 5.

FIG. 9 is an enlarged cross-sectional view taken along line 9—9 of FIG. 1.

FIG. 10 is a cross-sectional view taken along line 10—10.

Briefly stated, the invention comprises a front end loader device having a front and rear frame, pivotal means connecting the front and rear frames together, hydraulic activated loading arms mounted to the front frame, a pair of drive wheels mounted to the rear frame and a pair of drive wheels mounted to the front frame, an engine mounted in the rear frame, an operator's seat mounted directly over the engine, said operator's seat being pivotally mounted to provide access to said engine, said loader device having a hydrostatic drive for powering the front and rear wheels, and a hydraulic drive for activating the loading arms, hydraulic filters for said hydrostatic drive and hydraulic drive mounted below the operator's seat and projecting outward from the side of the loader to provide easy access for replacement and exchange of the filters, said engine being offset in relation to the center of the rear frame to enable said operator's seat to be located in a lower position in relation to the rear frame. a foot control pedal for said hydrostatic drive mounted to the rear frame in front of the operator's seat and positioned at an angle in relation to the longitudinal axis of the rear frame for easier operating of the pedal by the operator.

Figure 3:
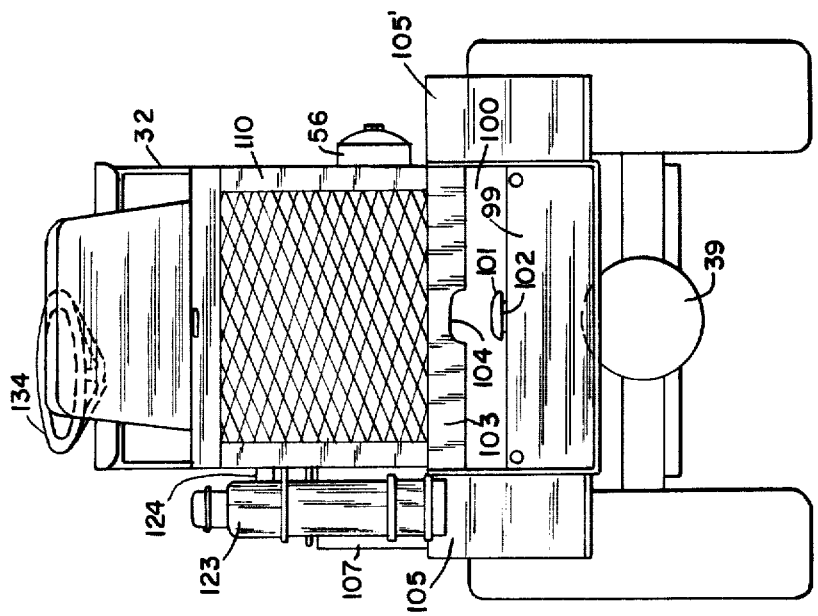
FIG. 3 is a rear elevational view of the front end loader invention.
Figure 2:
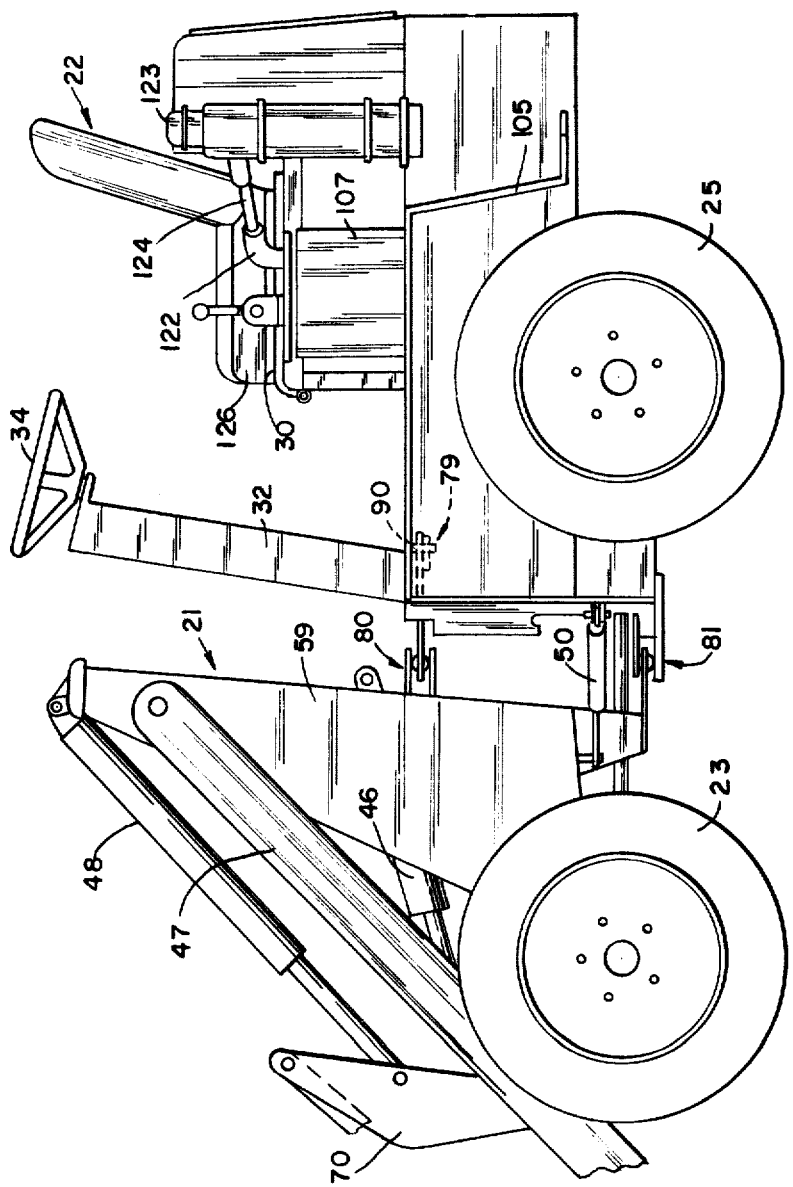
FIG. 2 is a left side elevational view of the front end loader invention.

Referring more particularly to the drawings in FIGS. 1, 2 and 3, the front end loader device 20 is illustrated as having a front and rear frame 21 and 22, respectively. A pair of drive wheels 23 and 24 are mounted to the front frame 21 and a pair of drive wheels 25 and 26 are mounted to the rear frame. A gasoline engine 27 is mounted to the rear frame with an operator's seat 28 mounted directly over the engine. The rear frame has a rectangular step-like center framework 29 which surrounds the engine 27. The operator's seat 28 is mounted to a plate member 30. The plate member 30 has a lateral flange portion 30' at its forward end. The lateral flange portion 30' is pivotally mounted to the front wall 31 of the center frame 29, so that the plate member 30 and seat 28 may pivot upward in a clockwise direction when viewed from FIG. 1 to provide access to the top of the engine 27. The device has a hydrostatic drive for powering the front and rear wheels. The control panel 32 has a dash board 33 with a steering wheel 34 mounted on the dash board. The hydrostatic drive has a hydrostatic pump 35 mounted directly in front of the engine 27. The pump is powered by the engine 27. The hydraulic pump 35, through conventional hydraulic lines, hydraulically activates the hydraulic motor 36 and the hydraulic motor through a gear reduction drive 37 drives the output shaft 38 of the rear axle 39 to drive the rear wheels. The gear reduction drive also drives the drive shaft 40 which drives shaft 40 through universal joints 41 and 42 drives the input shaft 43 of the front axle 44 to drive the front wheels 23 and 24 of the frame.

The hydraulic system has a hydraulic pump 45 mounted in front of the hydraulic pump 35, with a conventional adapter 45' therebetween, whereby the engine 27 drives the hydraulic pump 35 and the pump 45. The hydraulic pump 45 is connected in a conventional manner to the lifting cylinder 46 to hydraulically actuate the cylinder 46 for pivoting the lifting arms 47 and 47' upward and downward on the front frame. The pump 45 is also connected to a cylinder 48 which pivots the bucket 49 about the pivotal point axis 64 and 64' of the lifting arms 47 and in a conventional manner. The pump 45 is also hydraulically connected to the steering cylinder 51 and actuates the steering cylinder to pivot the front frame 21 relative to the rear frame to turn the loader in different directions. The steering wheel 34 is conventional connected to the hydraulic system to control the actuation of the steering cylinder 51 to thereby control the steering. A multi bank control valve system is conventionally connected to the hydraulic system and has a pair of control actuating valves 52 and 53 are also mounted on the dash board 33 of the upright control panel 32 of the rear frame 21 and are individually actuatable to actuate and control the cylinders 46 and 48, respectively to control the lifting arms movement and pivot bucket movement on the lifting arms.

The device has a hydraulic fluid storage tank 54 which is mounted in the rear frame beside the engine and which serves both the hydraulic system and the hydrostatic system as a hydraulic fluid reservoir. A removable cap 55 is mounted to the top of the tank and is removable for refilling the hydraulic fluid into the tank from time to time.

A pair of hydraulic fluid filters or cleaners 56 and 57 are mounted horizontally across the top of the storage tank 54 and project out through an opening 58 in the side of the central framework. The hydraulic filter 56 is conventionally connected to the hydrostatic system and serves to filter the hydraulic fluid in the hydrostatic drive system and the hydraulic filter 57 is conventionally connected to the hydraulic system and serves to filter the hydraulic fluid in the hydraulic system. The hydraulic filter 56 and 57 by projecting out the side of the framework may be easily exchanged or replaced from time to time by simply unthreading the bolts 56' and 57' at the outer ends of the filters.

The front frame 22 has a pair of upright triangular shaped supports 59 and 59' fixed together at their lower end by a lateral beam member 60 and project upward in spaced parallel relation. A pair of horizontal forwardly projecting beams 61 and 62 are fixed to the lower ends of the supports 59 and 59' and project forward with their front ends being fixed to the front axle 44 of the front wheels 23 and 24.

The lifting arms 47 and 47' are pivotally mounted at their upper ends to the support members 59 and 59', respectively, at pivot points 64 and 65 so that when the cylinder 46 is activated to telescope or retract its piston 46' to raise or lower the arms 47 and 47', the arms will pivot upward or downward about pivot points 64 and 65. The cylinder 46 is pivotally mounted at its rearward end to a pin 66 which extends between lugs 67 and 68, which lugs are fixed to support members 59 and 59'. The piston 46' is pivotally mounted on a pin 69 which pin is fixed between lifting arms 47 and 47'.

The bucket pivoting mechanism has a plate 70 which has one end fixed to a pin 71, which pin 71 is rotatably mounted in bores in the lifting arms 47 and 47'. The upper end of the plate 70 is pivotally mounted to a lever arm 72 at pivot point 70'. A lever arm 72 is pivotally mounted to the bucket at pivot point 73. The hydraulic cylinder 48 has its rearward end fixed to a pin 74 which pin is rotatably mounted in bores in flanges 75 and 75' which flanges are fixed to the top of the upright supports 58 and 59, respectivelly. The outer end of the piston rod 48' of the hydraulic cylinder 48 is pivotally mounted to plate member 70 at pivot point 76.

The actuation of the hydraulic cylinder 48 to telescope the piston 48' will pivot the plate 70 clockwise when viewed from FIG. 1, and thereby move the lever arm 72 from left to right which will pivot the bucket clockwise about the pivot points 50 and 50' on the lifting arms 47 and 47' and the retraction of the piston 48' will pivot the bucket in the opposite direction.

The front and rear frames are pivotally connected together for pivoting and oscillation by three swivel uni-ball connections 79, 80, and 81. The pivot points 79, 80, and 81 are a conventional ball and socket or swivel type connection.

The lower pivot or swivel connection 81 between the front and rear frame has a plate 82 fixed to a U-bracket 82' which bracket is fixed to the front frame and projects rearward. A pair of plates 83 and 83' are fixed to the rear frame and project forward. A uniball is socketed in a bore of plate 82 and swivels therein, and a bolt 84 passes through plates 83 and 83' and through a bore in the ball to provide a conventional pivotal as well as swivel type connection between the front and rear frames.

A lever arm 85 has a uniball 85' socketed in a bore with its forward end to swivel therein. A pair of plates 86 and 86' fixed to the front frame project rearward. A bolt 87 passes through a bore in the ball and through bores in the plates 86 and 86' to provide a conventional vertical pivot and swivel type connection 80 between the forward end of the lever arm 85 and the front frame directly above the pivotal, swivel connection 81.

Figure 7:
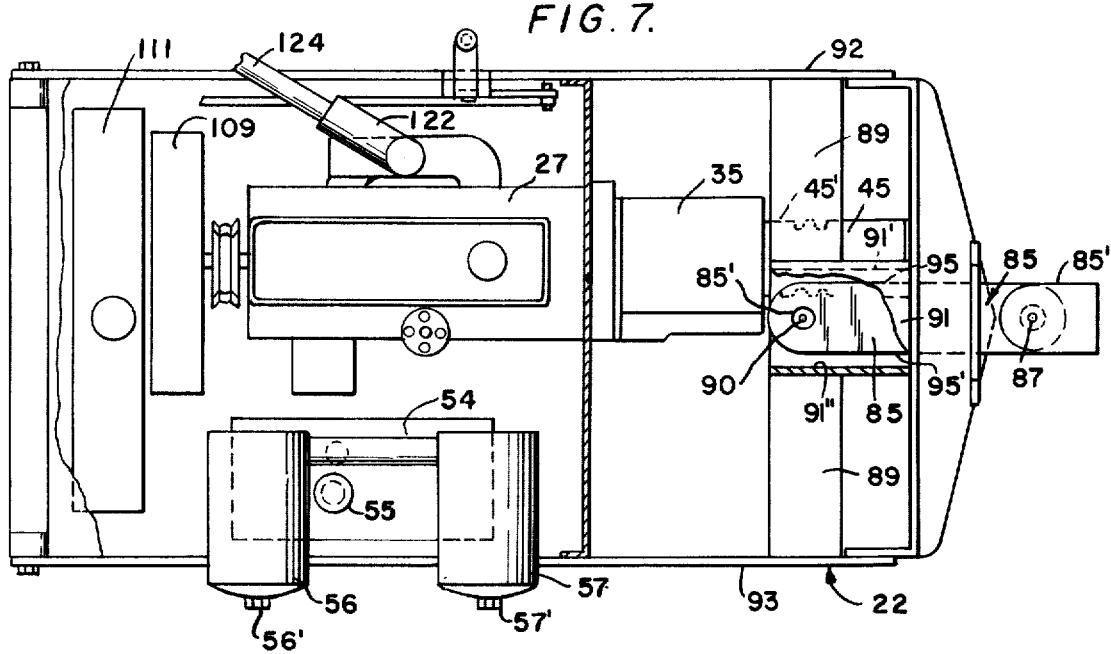
FIG. 7 is an enlarged top view of the rear frame of the front end loader similar to FIG. 5, with portions broken away to reveal the interior construction of the frame.

The rearward end of the lever arm or elongated plate 85 projects into the rear frame beneath the control panel 32 along the floor 88 in the operator's compartment area and is pivotally mounted to a crossbeam 89, by means of a bolt 90 which passes through a bore in an inverted U-channel member 91 and through a uniball 85' socketed in the rear end of the lever arm and is threaded into the crossbeam. The crossbeam 89 is fixed between the side walls 92 and 93 of the rear frame. The lever arm is free to pivot on the bolt within the limits of the sides 91' and 91'' of the U-shaped channel. The lever arm may pivot counterclockwise when viewed from FIG. 7 until its left edge engages the side 91' of the U-channel and may pivot clockwise until its edge engages the side 91'' of the U-channel.

The lever arm 85 projects a substantial distance into the rear frame beneath the control panel 33 into the operator's compartment area to provide an effective oscillation action.

The slot 97 in the front wall 98 of the rear frame has an upper and lower edge 97 and 97'' which limits the upward and lower movement of the lever arm, so that the lever arm can only move upward and downward to a limited extent.

REAR FRAME

The rear frame 22 has a gasoline tank 99 mounted across the lower rear end of the rear frame. An opening 100 is located above the tank 99 to provide access to the removable cap 101 for the gasoline tank. The cap 101, being removable so that the tank can be filled through the inlet tube 102 which extends into the tank. The rear frame also has a horizontal rear crossbeam 103 which extends across the rear of the frame and the beam 103 has a notch 104 to facilitate introducing a gasoline nozzle into the opening 100 and into the inlet tube 102.

The rear frame 22 has a pair of fenders 105 and 105' which are mounted to the opposing side walls or side panels 92 and 93 of the rear frame. A conventional electric storage battery 107 is mounted on the left fender 105 and is secured there by suitable means and electrically connected in a conventional manner to serve the electrical system of the loader device.

A conventional hydraulic cooling coil or radiator coil member 108 is mounted in the upright housing member 110 at the back of the rear frame and the cooling coils 108 act to cool the hydraulic fluid in the hydrostatic system. A cooling fan 109 is mounted directly behind the engine 27 and is driven by the engine in a conventional manner by a pulley belt drive 109' from the drive shaft of the engine. A radiator 111 is mounted in the housing member 110 and the housing member 110 has an opening 110' to provide access to the cap 111' of the radiator 108.

Figure 8:
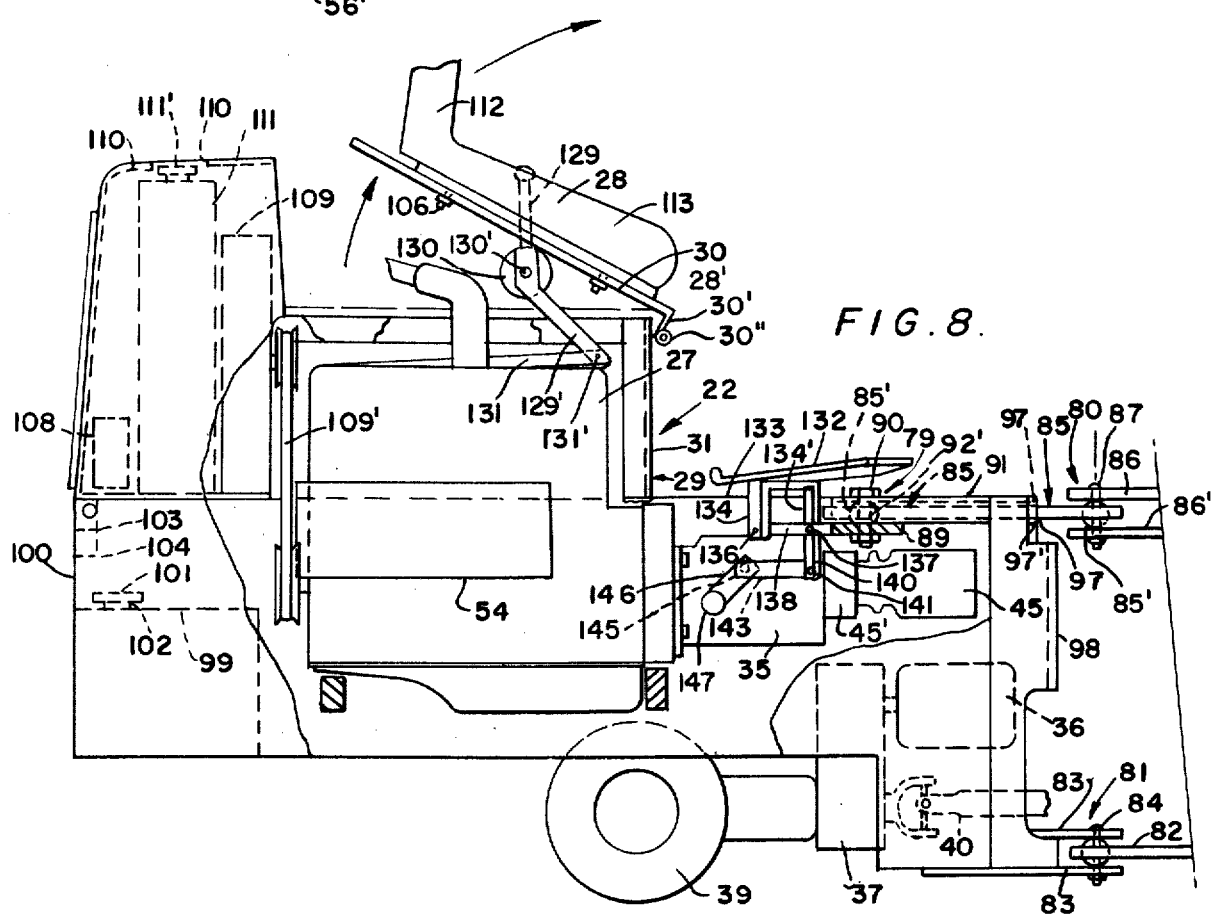
FIG. 8 is an enlarged right side elevational view of the rear frame front end loader, with portions broken away to reveal the interior construction thereof.

The operator's seat 28 has a spacer panel 28' fixed to the bolt of the seat. The spacer panel has threaded bolts 106 fixed thereto and projecting downward through bores in plate member 30 and nuts 106' are threaded onto the bolts to lock the seat 28 to plate member 30. The seat 28 being fixed to the plate 30 pivots clockwise when viewed from FIG. 1, with the plate 30 as it pivots about its pivotal hinge 30' upward as shown in FIG. 8.

The operator's seat 28 has a back rest portion 112 and a bottom seat member 113 fixed together. The bottom seat member has upwardly tapered sides 114 and 114'.

The engine 27 has a conventional carburetor 115 with a conventional choke control arm 116 which is pivotally mounted to the carburetor at pivot point 117. A control wire 118 has a handle 119 at one end. The control wire 118 passes through a bore in an upright plate 120, which plate 120 is fixed to a horizontal plate 121, which plate 121 is fixed to the side 91 of the rear frame. The inner end 118 of the wire is attached to the outer end of the control arm 116 so that pulling the wire 118 from right to left when viewed from FIG. 6, pivots the control arm 116 clockwise when viewed from FIG. 6 and pushing the wire 118 from left to right pushes the arm 116 counterclockwise to open and close the choke in the carburetor. The wire 118 will be slightly flexible but sufficiently rigid to be able to pivot the arm 116 counterclockwise when the wire is pushed.

The carburetor 115 has an air intake member 122. A conventional air cleaner 123 is fixed to the side of the rear housing member of the rear frame and a flexible rubber air intake conduit 124 extends from the air cleaner 123 to the air intake 122 of the carburetor so that air may be received into the carburetor through the cleaner.

The plate 30 has a lateral cutout 125 that enables the plate 30 and seat 28 to clear the air intake conduit and the control wire 118 when the seat is positioned closed over the engine as shown in solid lines in FIG. 1, and enables the plate 30 and seat 28 to pivot open without contacting or interferring with the air intake conduit 124 or the control wire 118, or the lever arm 129. The plate 30 also has a slot 125' in the rear edge to clear the radiator inlet conduit from the engine to the radiator 111.

The underside surfaces 126 and 127 of the bottom seat member are tapered upward with the upward taper 126 of the bottom seat member enabling the seat to clear the air intake conduit when the seat is pivoted closed horizontally over the engine. The engine 27 is offset slightly in relation to the longitudinal center line of the loader device so that the air intake conduit may project upward beside the seat member so the seat is centrally positioned lower on the rear frame to provide a lower more compact configuration to the loader device.

The plate member 30 when pivoted open, as illustrated in FIG. 8, provides direct access to the top of the engine for easy servicing of the engine and its carburetor and other components.

A lever arm 129 is pivotally mounted at pivot point 130' to a plate 130, which plate is fixed to the top of the central framework of the rear frame. The lever arm 129 has a lateral leg 129' fixed thereto and a connecting rod 131 has one end 131' pivotally mounted to the leg 129' and the other end pivotally attached to a conventional governor of the engine 27 so that pivoting the arm 129 pivots the leg 129' which moves the rod 131 to operate the governor to control the speed of the engine 27.

An accelerator pedal 132 is mounted to the floor 88 of the operator's compartment. The accelerator pedal 132 controls the hydraulic pump to thereby control the hydraulic motor and drive to the wheels.

The accelerator pedal 132 has a pair of flanges 134 and 134' which project downward on opposite sides of a horizontal flange 138. The horizontal flange 138 is fixed to a crossbeam 89. The crossbeam 90 is fixed between the side panels of the rear frame.

The flanges 134 and 134' are pivotally mounted to a pair of pins 136 and 137 on the horizontal flange 138, which pins are aligned along a common horizontal axis, so that the pedal may pivot clockwise or counterclockwise.

The flange 134' has an extension member 140 which projects below the pin 137. A pin 141 is fixed to the extension member 140 and extends horizontally outward. The pin member 141 has a ball fixed to its outer end which is rotatably mounted in a socket 142 in a rod member 143 to provide a swivel connection. The other end of the rod member 143 also has a socket to receive a ball 144. A bolt rod 145 is fixed to the ball and projects outwardly and is attached to the upper end of a lever arm 146 to provide a swivel connection between the upper end of the lever arm 146 and the other end of the rod 143. The lower end of the arm 146 is fixed to control shaft 147 which extends into the pump 35.

The accelerator pedal operates by the operator placing his foot on the pedal and if he wished to go forward he will pivot the pedal clockwise when viewed from FIG. 8 which moves the rod member 143 from right to left which pivots the arm 146 counterclockwise, which pivots the control shaft 147 counterclockwise. The pivoting of the control shaft arm 147 counterclockwise accelerates the pumping action of the pump causing the pump to operate faster and through its connection with the hydraulic motor and the motor diving through the gear reduction the wheel causing the hydraulic motor and wheels to operate faster causing the device to move forward at a faster rate. Pivoting the pedal 132 in the opposite direction counterclockwise when viewed from FIG. 8, causing the pump to reverse the direction of rotation of the hydraulic motor to be reversed, thus reversing the direction of rotation of the wheels to cause the loader to move in the reverse direction.

The accelerator pedal 132 is pivotally mounted at an angle in relation to the longitudinal axis of the loader, so that the operate the pedal when the operator is sitting on the operator's seat 28 and operating the device. The swivel connections by the ball and sockets in each end of the rod member enable the pedal to actuate the control shaft 147 even though the pedal 132 is at an angle in relation to the control shaft. A coil spring has its upper end attached to the control shaft and projects radially and vertically downward from the shaft and has its lower end attached to a lug, which lug is fixed to the bottom of the pump 35 and is under tension to urge the control shaft in a nuetral position between its forward and backward movement.

Thus, it will be seen that a novel compact front end loader has been provided with a compact rear frame construction with the operator's seat directly over the engine, and with the engine, hydrostatic and hydraulic filters, and inlets to the radiator and gasoline tank and various other components are readily accessible for servicing from the exterior of the rear frame.

It will be obvious that various changes and departures may be made to the invention without departing from the spirit thereof, and accordingly, it is not intended that the invention be limited to that specifically described in the specification or illustrated in the drawing but only as set forth in the appended claims wherein:

What is claimed is:

1. A front end loader device comprising a front and rear frame spaced from one another, drive wheels on said front and rear frame, loading arms pivotally mounted to said front frame with hydraulic means to raise and lower said loading arms, a box-like engine compartment at the rear of said rear frame with steering controls and operator's controls for said loader at the front of said rear frame, articulated means connecting said front and rear frames together, a fuel combustion engine for powering said drive wheels, said engine being mounted within said compartment, said compartment comprising upright side walls on opposite sides of said engine and a rear wall and top panel covering said engine, said top panel being pivotally mounted relative to the side walls to pivot from a horizontally closed position over said engine to an upward acute angle to provide direct access to said engine from the top of said engine, an operator's seat mounted to said top panel to pivot with said top panel said compartment having an opening in said upright side walls with hydraulic fluid filter means projecting outward through said opening to provide access from the exterior of said compartment to replace said filter means, said compartment having an opening adjacent its other side wall with an air intake conduit extending through said opening along a path beneath said operator's seat when said seat is closed, air cleaner means mounted to the exterior of said compartment connected to said conduit at its other end, a carburetor for said engine within said compartment connected to said conduit at its inner end to provide air for said engine carburetor, a radiator for cooling said engine mounted upright at the rear of said compartment behind said engine and having an inlet at its top, a fuel tank for fueling said engine mounted in spaced relation below said radiator, at the rear of said compartment said compartment having an opening in its upper rear surface at the top of the radiator to provide direct access to the inlet at the top of the radiator, said compartment having an opening in its rear wall in the space between the radiator and the fuel tank to provide direct access to the top of the fuel tank.

2. A front end loader comprising a front and rear frame spaced from one another, an articulated connection connecting the front and rear frames together loading arms pivotally mounted to the front frame hydraulic cylinder means to actuate the loading arms, said rear frame having an engine compartment with an engine mounted therein for powering the loader, an operator's seat mounted directly over the engine compartment, an operator's control panel mounted to said rear frame spaced in front of said engine compartment, a floor for the operator's feet extending from the bottom of the engine compartment to the bottom of the control panel, said articulated connection comprising three swivel connections, one of said swivel connections connecting the lower edge of the rear frame to the lower edge of the flat frame by means of relatively short lug means extending from the rear frame and relatively short lug means extending from the front frame overlapping one another with a swivel connection therebetween, said second of said swivel connections comprising a relatively long plate adjacent the upper end of the rear frame and a relatively short lug means extending from the upper edge of the front frame with the forward end of the plate and short lug means in overlapping relation to one another with a swivel connection therebetween, said rear end of the plate extending a substancial distance into the rear frame along the floor thereof with the rearward end of the plate rearward of the control panel and with a swivel connection connecting the rear end of the plate to the floor, said loader having a hydrostatic drive for powering said loader, said engine powering said hydrostatic drive, a foot pedal member is mounted to the floor of the rear frame between the engine compartment and control panel, said foot pedal member being positioned in length on said floor at a lateral angle extending horizontally toward one lateral side of the loader in relation to the longitudinal axis extending through the center of the rear frame from the rear to the front, said operator's seat being aligned along said longitudinal axis so that the foot pedal will be at an angle in relation to the operator's seat with the forward end of the pedal diverging laterally outward further than the rearward end of the pedal, said pedal being pivotally mounted about a horizontal axis perpendicular to said lateral angle to move upward and downward while remaining in said angled relation for the operating by the operator's foot while seated in the operator's chair, said hydrostatic drive being mounted in alignment with said longitudinal axis, an offset swivel connection means connecting said pedal to the hydrostatic drive whereby the pedal movement controls the hydrostatic drive.

* * * * *